Oct. 16, 1934.   F. PERSON   1,977,084
ELECTRICALLY HEATED PIE BAKER
Filed Sept. 15, 1933
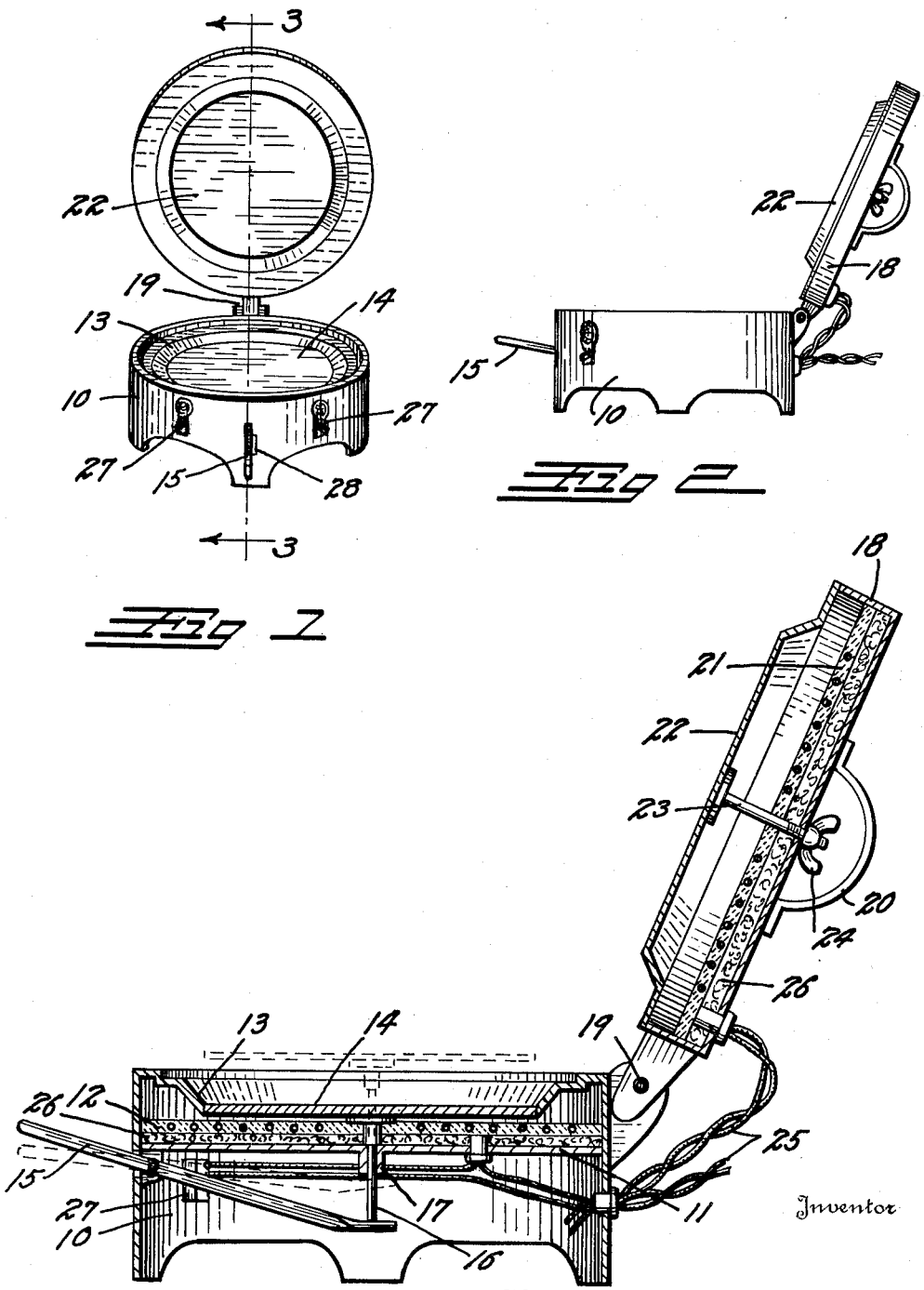
Inventor
FRANCIS PERSON Patented Oct. 16, 1934

1,977,084

UNITED STATES PATENT OFFICE 1,977,084

ELECTRICALLY HEATED PIE BAKER

Francis Person, Denver, Colo.

Application September 15, 1933, Serial No. 689,551

4 Claims. (Cl. 53—10)

This invention relates to an electric pie baker and has for its principal object the provision of a neat, efficient, self-contained device which can be used to thoroughly bake the lower crust of the pie and simultaneously mold it to the proper pie shape.

Another object of the invention is to so construct the device that the crust will be baked by the application of heat to both its top and bottom surfaces.

A further object is to provide a device of this character which will not only bake the bottom crust of a pie but which can also be used to brown or bake the filling after the crust has been filled.

A still further object is to provide means for removing the completed pie or crust from the device after baking.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective front view of the complete device.

Fig. 2 is a side view thereof.

Fig. 3 is an enlarged cross section taken on the line 3—3, Fig. 1.

The invention comprises: a base shell 10 provided with a sub-bottom 11 for supporting an electrical heating element 12 on suitable heat insulation 26. The top of the shell 10 is indented to form an inwardly extending flange 13. The flange 13 is annularly contoured to the usual pie shape. The inwardly extending flange 13 outlines an open bottom which is closed by means of an elevatable bottom plate 14.

The bottom plate 14 may be raised to the broken line position of Fig. 3 by means of a lever 15 which extends through the shell 10 and actuates a push-rod 16. The push rod 16 extends upwardly to, and is preferably connected with, the bottom 14 through a suitable guide bearing 17 formed on the sub-bottom 11.

A lid member 18 is hinged to the shell 10 by means of a suitable hinge 19 which allows it to close thereover or supports it in the upright position of Fig. 3. A suitable handle 20 is provided by means of which the lid member 18 may be lifted.

A second heating element 21 is carried in the lid member 18, suitable heat insulation 26 being provided between the lid and the element. A removable, sheet metal, pie-form 22 is attached to the front face of the lid member 18 by means of a suitable stud 23 and wing nut 24.

Electrical current is supplied to both heating elements 12 and 21 through suitable conductors 25. Two independent switches 27 are provided, one for the element 12 and one for the element 21.

Let us assume that it is desired to bake a typical open faced pie. The rolled dough is placed over the top of the shell, the lid member 18, with the pie form 22 in place, is closed thereon. This presses the dough into the mold in the top of the shell and forms it to a perfect pie contour. The dough may then be trimmed around the shell 11. The heating elements are both turned on so as to quickly bake the thin dough sheet therebetween.

The lid member 18 is then raised and the pieform 22 is removed. The baked crust is filled and the lid again lowered so as to bake or brown the filling therein. In the latter operation, only the upper heating element 21 may be used if it is desired only to brown or toast the meringue or covering of said pie.

It is desired to call especial attention to the following features. It will be noted that the heating element 21 is set well back in the lid member 18 so that when the pie form 22 is removed, sufficient space will be allowed in the lid member to allow a high topped pie to project into the lid without contacting the heating element 21. It is also to be noted that when the bottom plate 14 is lifted by means of the lever 15 it can be grasped by the hands and completely removed from the device. This allows easy access to the interior of the shell and the heating element for cleaning purposes, and allows the bottom plate to be easily washed. In this connection it will be noted that the pie form 22 can be easily removed for washing purposes.

If desired, a latching notch 28 may be formed in the shell 10 along side the lever 15, into which, the lever may be forced when the bottom plate is elevated. This causes the plate to hold the pie supported while the operator uses both hands to remove the pie from the plate.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An electrical pie baker comprising: a base member having a pie-shaped depression in its top; a heating element below said depression; a lid member hinged to said base member, said lid member being hollow so that a pie may be baked therein; a second heating element mounted in said lid member; and a detachable projecting form on said lid member adapted to enter the depression of said base member to preform the pie-crust therein.

2. An electrical pie baker comprising: a base member having a pie-shaped depression in its top; a heating element below said depression; a lid member hinged to said base member; a second heating element mounted in said lid member; a separable bottom in said pie-shaped depression; and means for raising said bottom so as to lift the pie therefrom, said latter means comprising: a push rod extending downwardly from said bottom; a lever extending outwardly through said shell and contacting said push rod so that operation of said lever will lift said bottom.

3. An electrical pie baker comprising: a base member having a pie-shaped depression in its top; a heating element below said depression; a lid member hinged to said base member, said lid member being hollow so that a pie may be baked therein; a second heating element mounted in said lid member; and a detachable projecting form on said lid member adapted to enter the depression of said base member to preform the pie-crust therein.

4. An electrically heated pie baker comprising: a lower base member shaped to receive the lower crust of a pie; an upper cover member, said cover member being hollow so that a pie may be baked therein; and a detachable downwardly projecting member on lower side of said cover member to shape the inner surfaces of a pie crust.

FRANCIS PERSON.